(12) United States Patent
Schantz et al.

(10) Patent No.: US 10,241,584 B2
(45) Date of Patent: Mar. 26, 2019

(54) GESTURE DETECTION

(71) Applicant: LENOVO (Singapore) PTE. LTD., New Tech Park (SG)

(72) Inventors: Daniel Jordan Schantz, Raleigh, NC (US); Matthew Joseph Geary, Raleigh, NC (US); Wesley Abram Luttrell, Raleigh, NC (US); Christopher Miles Osborne, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 99 days.

(21) Appl. No.: 15/278,474

(22) Filed: Sep. 28, 2016

(65) Prior Publication Data

US 2018/0088672 A1    Mar. 29, 2018

(51) Int. Cl.
*G06F 3/01* (2006.01)
*G06F 3/16* (2006.01)
*G06F 3/00* (2006.01)

(52) U.S. Cl.
CPC .............. *G06F 3/017* (2013.01); *G06F 3/167* (2013.01); *G06F 3/005* (2013.01)

(58) Field of Classification Search
None
See application file for complete search history.

(56) References Cited

U.S. PATENT DOCUMENTS

| 2007/0192910 | A1* | 8/2007 | Vu ........................... B25J 5/007 700/245 |
| 2012/0105257 | A1* | 5/2012 | Murillo .................... G06F 3/017 341/20 |
| 2015/0109193 | A1* | 4/2015 | Sly ...................... G06K 9/00892 345/156 |
| 2017/0308264 | A1* | 10/2017 | Osotio ................ G06F 3/04815 |

* cited by examiner

*Primary Examiner* — Duane N Taylor, Jr.
(74) *Attorney, Agent, or Firm* — Kunzler, PC

(57) ABSTRACT

Apparatuses, methods, systems, and program products are disclosed for gesture detection. A method includes detecting an auditory cue associated with a predefined gesture based on input received from one or more sensors. The method includes detecting a gesture in response to the auditory cue based on gesture input received from the one or more sensors. The method includes performing an action associated with the detected gesture in response to determining the detected gesture is the predefined gesture associated with the auditory cue.

18 Claims, 5 Drawing Sheets

GESTURE DETECTION

FIELD

The subject matter disclosed herein relates to detecting gestures and more particularly relates to detecting gestures responsive to an auditory cue.

BACKGROUND

Performing gestures may be one method of providing input to a device, and many devices may be capable of detecting gestures performed by a user to cause a device to execute various functions. However, it may be difficult for a device to differentiate among the various movements and characteristics of different users performing gestures, and the various different types of gestures that can be performed.

BRIEF SUMMARY

An apparatus for device interruption is disclosed. A method and computer program product also perform the functions of the apparatus. The apparatus, in one embodiment, includes one or more sensors, a processor, and a memory that stores code executable by the processor. In some embodiments, the code is executable by the processor to detect an auditory cue associated with a predefined gesture based on input received from the one or more sensors. In a further embodiment, the code is executable by the processor to detect a gesture in response to the auditory cue based on gesture input received from the one or more sensors. In some embodiments, the code is executable by the processor to perform an action associated with the detected gesture in response to determining the detected gesture is the predefined gesture associated with the auditory cue.

In various embodiments, the auditory cue comprises a predefined phrase. In one embodiment, the auditory cue comprises a predefined sound. In some embodiments, the predefined gesture comprises a body gesture. In certain embodiments, the predefined gesture comprises a facial gesture. In one embodiment, the predefined gesture comprises a combination of a body gesture and touch gesture.

In a further embodiment, the detected gesture is detected one of before and simultaneously with detection of the auditory cue. In one embodiment, the auditory cue is detected in response to determining that a particular individual associated with the auditory cue is the individual providing the auditory cue.

In some embodiments, the code is further executable by the processor to associate the auditory cue with the predefined gesture. In one embodiment, the code is further executable by the processor to associate a combination of the auditory cue and the predefined gesture with the action. In a further embodiment, the one or more sensors is selected from the group consisting of a digital camera, an infrared camera, a capacitance sensor, a microphone, a vibration sensor, and a noise field sensor.

A method, in one embodiment, includes detecting, by use of a processor, an auditory cue associated with a predefined gesture based on input received from one or more sensors. In some embodiments, the method includes detecting a gesture in response to the auditory cue based on gesture input received from the one or more sensors. In a further embodiment, the method includes performing an action associated with the detected gesture in response to determining the detected gesture is the predefined gesture associated with the auditory cue.

In certain embodiments, the auditory cue comprises one of a predefined phrase and a predefined sound. In some embodiments, the predefined gesture comprises one of a body gesture and a facial gesture. In one embodiment, the predefined gesture comprises a combination of a body gesture and touch gesture. In certain embodiments, the detected gesture is detected one of before and simultaneously with detection of the auditory cue.

In one embodiment, the auditory cue is detected in response to determining that a particular individual associated with the auditory cue is the individual providing the auditory cue. In certain embodiments, the method includes associating the auditory cue with the predefined gesture. In a further embodiment, the method includes associating a combination of the auditory cue and the predefined gesture with the action.

A program product, one embodiment, includes a computer readable storage medium that stores code executable by a processor. In various embodiments, the executable code includes code to perform detecting an auditory cue associated with a predefined gesture based on input received from one or more sensors. In some embodiments, the executable code includes code to perform detecting a gesture in response to the auditory cue based on gesture input received from the one or more sensors. In a further embodiment, the executable code includes code to perform performing an action associated with the detected gesture in response to determining the detected gesture is the predefined gesture associated with the auditory cue.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
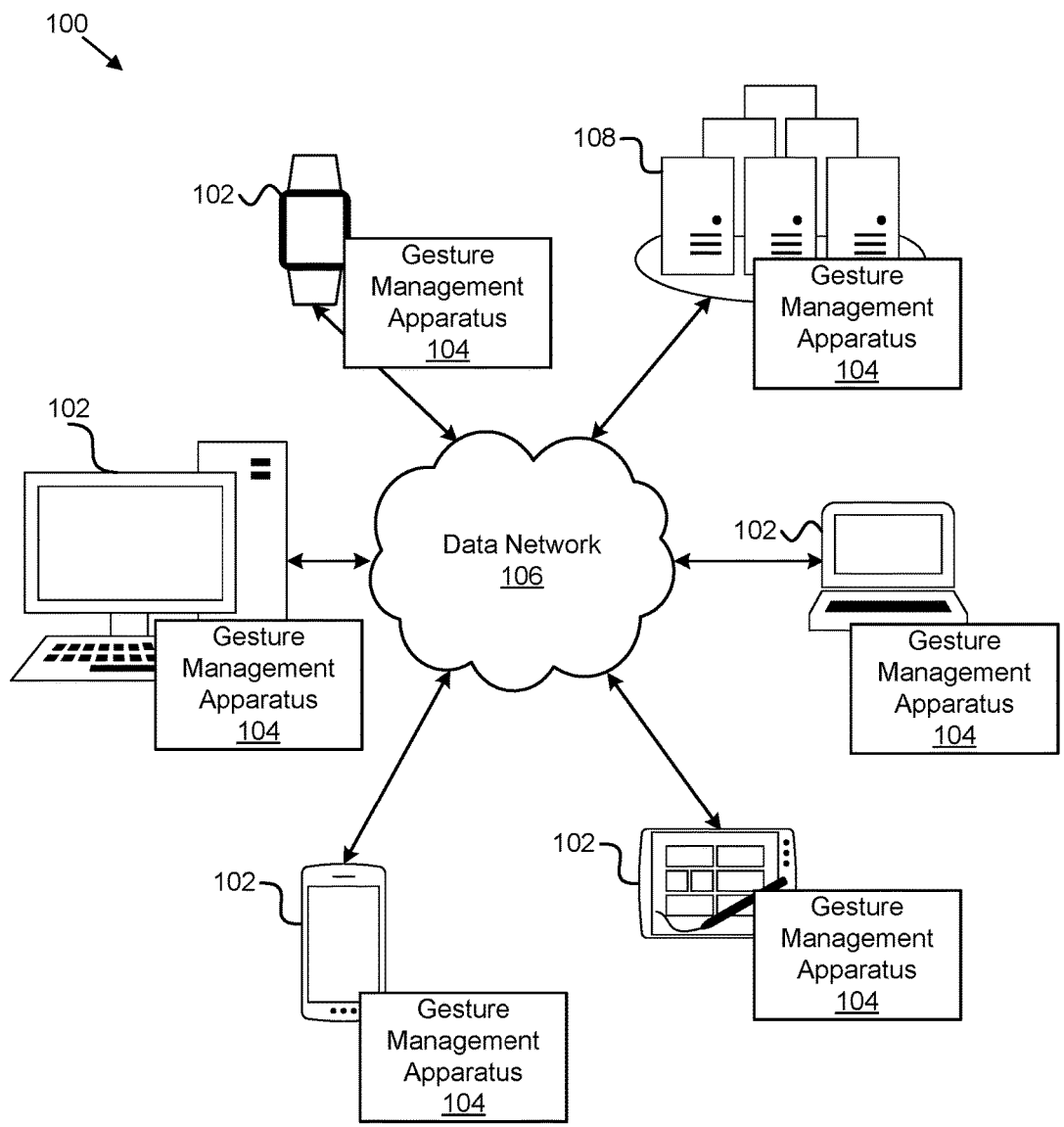
FIG. 1 is a schematic block diagram illustrating one embodiment of a system for gesture detection.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for gesture detection. In one embodiment, the system 100 includes one or more information handling devices 102, one or more gesture management apparatuses 104, one or more data networks 106, and one or more servers 108. In certain embodiments, even though a specific number of information handling devices 102, gesture management apparatuses 104, data networks 106, and servers 108 are depicted in FIG. 1, one of skill in the art will recognize, in light of this disclosure, that any number of information handling devices 102, gesture management apparatuses 104, data networks 106, and servers 108 may be included in the system 100 for gesture detection.

In one embodiment, the system 100 includes one or more information handling devices 102. The information handling devices 102 may include one or more of a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108. The information handling devices 102 may include one or more sensors for detecting individuals, faces, movements, sounds, vibrations, and/or the like.

In one embodiment, the gesture management apparatus 104 is configured to detect a gesture that a user is performing responsive to detecting a cue that is associated with the gesture. The gesture management apparatus 104, in one embodiment, is configured to detect an auditory cue associated with a predefined gesture based on input received from the one or more sensors. The gesture management apparatus 104, in a further embodiment, is configured to detect a gesture in response to the auditory cue based on gesture input received from the one or more sensors. The gesture management apparatus 104, in some embodiments, is configured to perform an action associated with the detected gesture in response to determining the detected gesture is the predefined gesture associated with the auditory cue. The gesture management apparatus 104, including its various sub-modules, may be located on one or more information handling devices 102 in the system 100, one or more servers 108, one or more network devices, and/or the like. The gesture management apparatus 104 is described in more detail below with reference to FIG. 2.

In one embodiment, the gesture management apparatus 104 improves the functionality and/or usability of the computer, computing technology, computing environment, or the like, by detecting a gesture responsive to an auditory cue associated with the gesture so that inadvertent gestures can be prevented and/or gestures that may be difficult to detect can be recognized. In this manner, a user can associate an auditory cue with a gesture so that the gesture can be easily and efficiently detected in response to the auditory cue.

In various embodiments, the gesture management apparatus 104 may be embodied as a hardware appliance that can be installed or deployed on an information handling device 102, on a server 108, or elsewhere on the data network 106. In certain embodiments, the gesture management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the gesture management apparatus 104 may include a power interface, a wired and/or wireless network interface, a graphical interface that attaches to a display, and/or a semiconductor integrated circuit device as described below, configured to perform the functions described herein with regard to the gesture management apparatus 104.

The gesture management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the gesture management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the gesture management apparatus 104.

The semiconductor integrated circuit device or other hardware appliance of the gesture management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the gesture management apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. The one or more servers 108 may be communicatively coupled (e.g., networked) over a data network 106 to one or more information handling devices 102. The one or more servers 108 may store data associated with an information handling device 102, with a user, and/or the like. For example, a server 108 may store data associated with one or more auditory cues and/or gestures, may perform voice or facial recognition processing, and/or the like.

Figure 2:
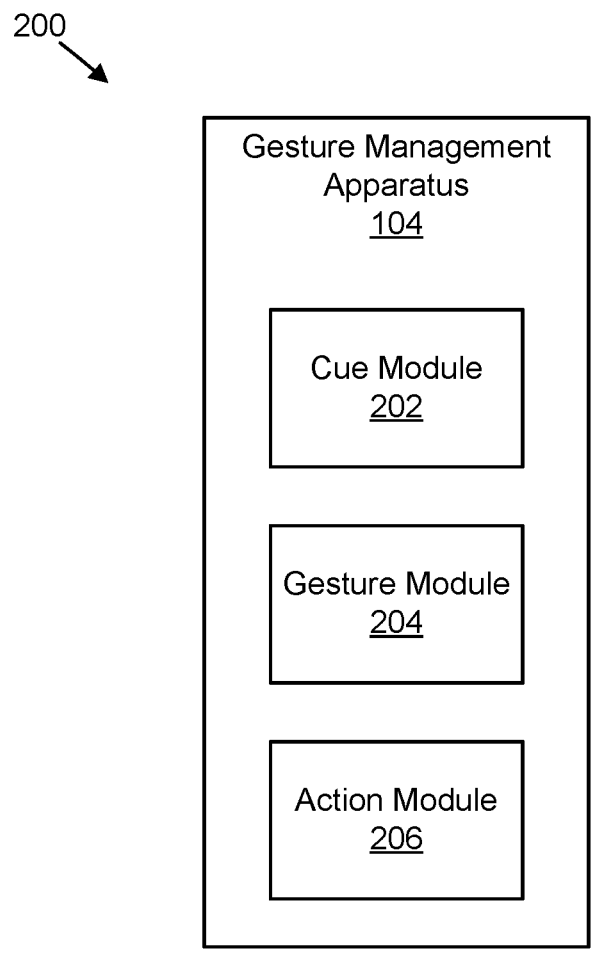
FIG. 2 is a schematic block diagram illustrating one embodiment of an apparatus for gesture detection.

FIG. 2 is a schematic block diagram illustrating one embodiment of an apparatus 200 for gesture detection. In one embodiment, the apparatus 200 includes an embodiment of a gesture management apparatus 104. The gesture management apparatus 104, in some embodiments, includes one or more of a cue module 202, a gesture module 204, and an action module 206, which are described in more detail below.

The cue module 202, in one embodiment, detects an auditory cue associated with a predefined gesture based on input received from one or more sensors. In such an embodiment, the one or more sensors may include a microphone, a vibration sensor, a noise field sensor, and/or the like. The cue module 202, in one embodiment, actively monitors for auditory cues (e.g., may periodically poll a microphone or other sensor for auditory data), may receive input data from a sensor in response to the sensor detecting auditory data, or the like.

In one embodiment, the auditory cue includes a predefined word, phrase, sentence, or the like. The cue module 202, for example, may process input data from a microphone to determine whether a user is speaking a predefined phrase as the auditory cue, such as "next slide," "back," scroll down," "scroll up," or the like. In one embodiment, the cue module 202 compares a received word, phrase, sentence, or the like to a table, library, list, or the like of predefined auditory cues to determine whether the received word, phrase, sentence, or the like is registered as a predefined auditory cue (e.g., if a sound signature for the word, phrase, sentence, or the like, matches a predefined or registered sound signature). If so, the cue module 202 may trigger, signal, alert, or the like, the gesture module 204, below, to detect a gesture associated with the auditory cue.

In certain embodiments, the auditory cue includes a predefined sound. For example, the cue module 202 may process input data from a microphone to determine whether a sound, such as a snap, tap, knock, whistle, and/or the like is an auditory cue 202. In one embodiment, the cue module 202 compares a received sound to a table, library, list, or the like of predefined auditory cues to determine whether the received sound is registered as a predefined auditory cue (e.g., if a sound signature for the sound matches a predefined or registered sound signature). If so, the cue module 202 may trigger, signal, alert, or the like, the gesture module 204, below, to detect a gesture associated with the auditory cue.

The gesture module 204, in one embodiment, detects a gesture in response to the auditory cue based on gesture input received from the one or more sensors. In such an embodiment, the one or more sensors may include a proximity sensor, a motion sensor, a digital camera, an infrared camera, a capacitance sensor, and/or the like. The gesture module 204, in one embodiment, actively monitors for gestures performed by a user in response to the auditory cue detected by the cue module 202.

For example, the gesture module 204 may activate one or more gesture detecting sensors, may receive data from the one or more gesture detecting sensors, or the like, in response to the cue module 202 detecting an auditory cue associated with a predefined gesture. In some embodiments, the gesture module 204 detects the gesture after the auditory cue is provided. For example, the gesture module 204 may activate one or more gesture sensors for a period of time (e.g., 5 seconds, 10 seconds, or the like) to detect gestures after the user provides an auditory cue. In certain embodiments, the gesture module 204 detects the gesture simultaneously with the detection of the auditory cue by the cue module 202 (e.g., the various sensors for detecting auditory cues and gestures may constantly be on or active). The gesture module 204, after receiving gesture data from the one or more sensors, may determine what the gesture is that the user is attempting to perform. For example, the gesture module 204 may track and process movements, forms, shapes, or the like of the gesture based on image data captured by a camera.

In some embodiments, the gesture comprises a body gesture. For example, the gesture may include a hand gesture, an arm gesture, a leg gesture, a head gesture, or the like, or any combination of the foregoing. In some embodiments, the gesture comprises a facial gesture. For example, the facial gesture may include an eye movement, an eyebrow movement, a mouth movement, a nose movement, or the like, or any combination of the foregoing.

In some embodiments, the gesture comprises a touch gesture. For example, the touch gesture may include a swipe gesture, a tap gesture, a hover gesture, or the like, or any combination of the foregoing. In such an embodiment, the gesture may be detected by a capacitance sensor, for example, on a touch screen, a touch pad, embedded in a keyboard (e.g., to receive hover gestures performed above the keyboard), or the like. Thus, in one embodiment, the detected gesture may be a combination of a body gesture, a facial gesture, and/or a touch gesture.

In some embodiments, the cue module 202 and/or the gesture module 204 associates an auditory cue with a gesture and stores the association of the auditory cue and the gesture in a table, list, database, or the like for reference at a later point in time. In certain embodiments, the cue module 202 and/or the gesture module 204 determines and associates an identity of a user creating the auditory cue-gesture pairing so that the auditory cue and/or the gesture is only detected if the user associated with the auditory cue and/or gesture is the person who created the auditory cue-gesture pairing. For example, the cue module 202 may associate a user with a sound signature of an auditory cue provided by the user. Similarly, the gesture module 204 may associate a user with one or more images of a gesture provided by a user.

For example, a teacher may generate an auditory cue-gesture pairing comprising an auditory cue "next slide" and a gesture of waving a hand in the air from left to right, which may be intended to move a slideshow presentation to the next slide in the presentation. Accordingly, if a student or another person attempts to provide the auditory cue "next slide" and the waving gesture combination, the cue module 202, the gesture module 204, and/or the action module 206, below, may not recognize the auditory cue, may not recognize the gesture, and/or may not perform the associated action because the identity of the student does not match the identity of the teacher. In such an embodiment, a user's identity may be determined based on voice analysis, facial recognition, body feature recognition (e.g., height, width, head size, or the like), which may be determined from input data received from one or more sensors.

In one embodiment, the action module 206 performs an action associated with the detected gesture in response to determining the detected gesture is the predefined gesture associated with the auditory cue. In certain embodiments, the cue module 202, the gesture module 204, and/or the action module 206 maintains, manages, updates, creates, revises, or the like a table, list, database, or the like of a pairing of auditory cues to predefined gestures associated with the auditory cues. For example, the auditory cue "next slide," may be paired with a hand gesture comprising a waving motion in the air or on a touch-sensitive device from left to right. Similarly, the auditory cue "previous slide" or "back" may be paired with a hand gesture comprising a waving motion in the air or on a touch-sensitive device from right to left.

In certain embodiments, the action module 206 associates a predefined action with an auditory cue-predefined gesture pair, which may be stored in a table, list, database, or the like. Thus, in the example above, when the "next slide" auditory cue and associated gesture are performed (e.g., waving a hand in the air from left to right), the action module 206 may look up or otherwise determine the action associated with the gesture, which, in the example above, may move a slide show presentation to the next slide.

Figure 3:
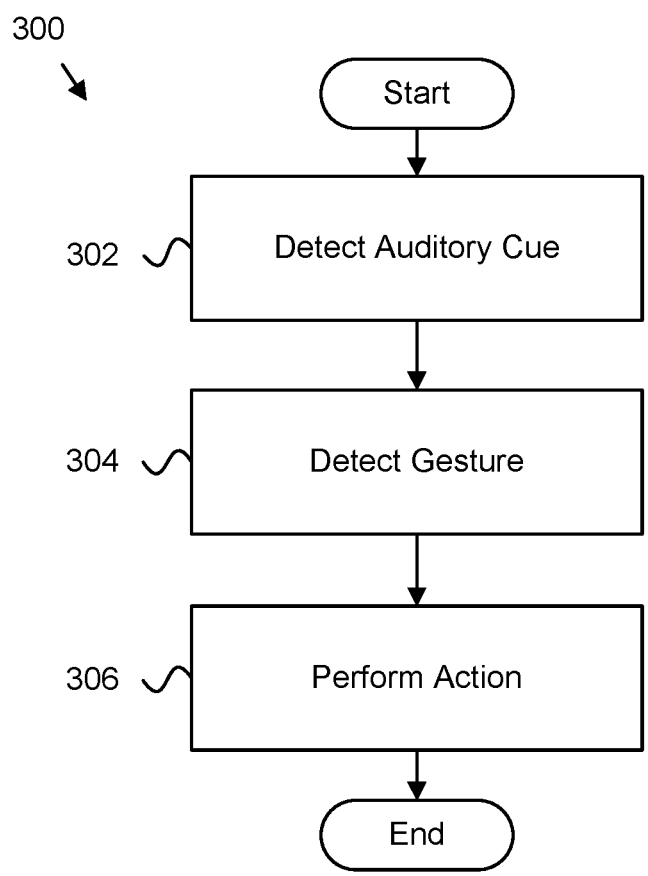
FIG. 3 is a schematic flow chart diagram illustrating one embodiment of a method for gesture detection.

FIG. 3 is a schematic flow chart diagram illustrating one embodiment of a method 300 for gesture detection. In one embodiment, the method 300 begins and the cue module 202 detects 302 an auditory cue associated with a predefined gesture based on input received from one or more sensors. In a further embodiment, the gesture module 204 detects 304 a gesture in response to the auditory cue based on gesture input received from the one or more sensors. In certain embodiments, the action module 206 performs 306 an action associated with the detected gesture in response to determining the detected gesture is the predefined gesture associated with the auditory cue, and the method 300 ends.

Figure 4:
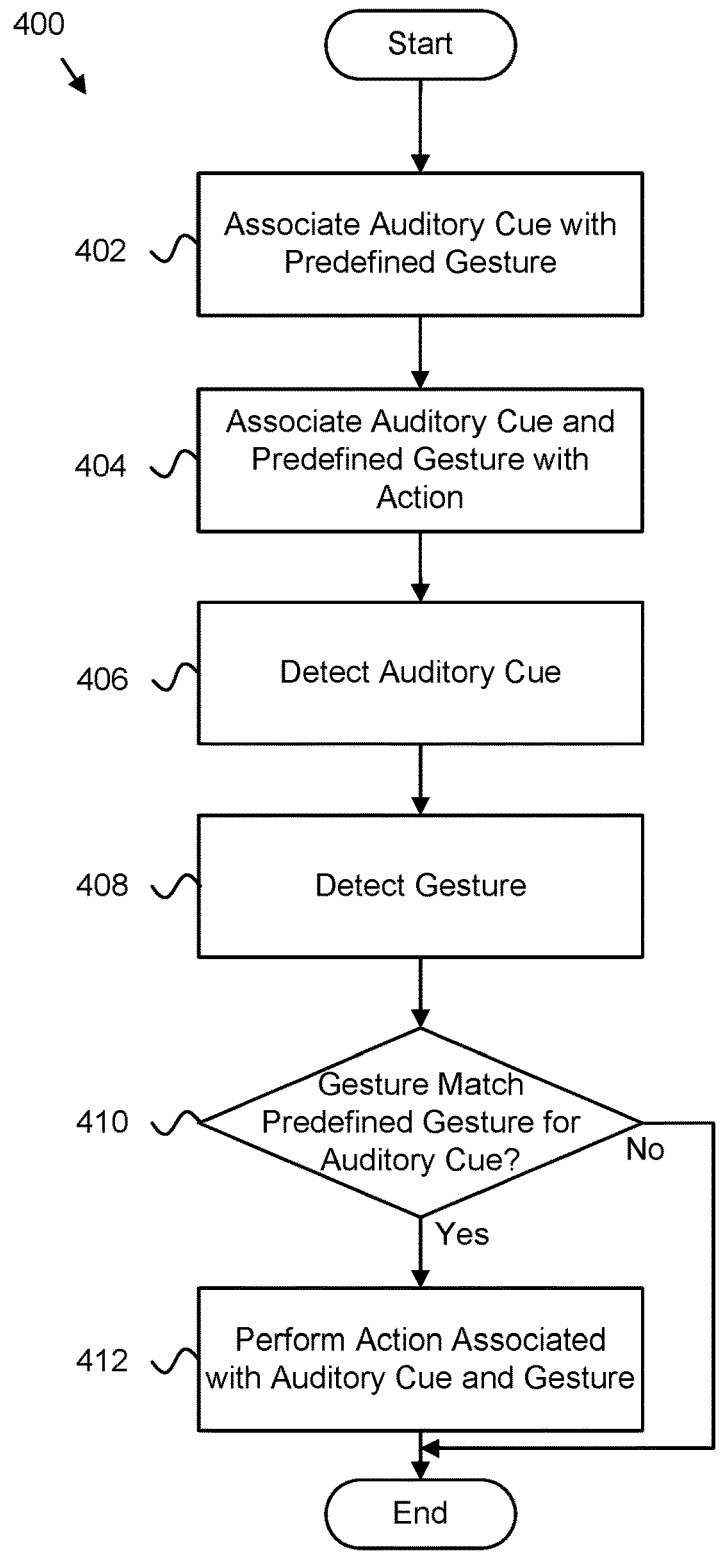
FIG. 4 is a schematic flow chart diagram illustrating one embodiment of another method for gesture detection.

FIG. 4 is a schematic flow chart diagram illustrating one embodiment of a method 400 for gesture detection. In one embodiment, the method 400 begins and the cue module 202 and/or the gesture module 204 associates 402 an auditory cue with a predefined gesture, e.g., the gesture module 204 may associate 402 the auditory cue "scroll up" with a waving hand gesture in a bottom to top, or down to up, motion.

The gesture module 204 and/or the action module 206, in one embodiment, associates 404 the auditory cue and associated predefined gesture with an action. Continuing with the previous example, the action module 206 may associate 404 the auditory cue "scroll up" with its associated hand gesture with a scroll-up action in a web browser, or another active application.

In some embodiments, the cue module 202 detects 406 an auditory cue associated with a predefined gesture based on input received from one or more sensors. In a further embodiment, the gesture module 204 detects 408 a gesture in response to the auditory cue based on gesture input received from the one or more sensors.

In various embodiments, the cue module 202, the gesture module 204, and/or the action module 206 determines 410 whether the performed or detected gesture matches the predefined gesture associated with the detected auditory cue. If not, the method 400 ends. For example, if the detected gesture for the auditory cue "scroll up" is a head nod gesture in an up to down motion, the gesture module 204 may determine 410 that the detected gesture does not match the predefined gesture, e.g., a hand waving gesture in a down to up motion, and the method 400 ends.

Otherwise, if the cue module 202, the gesture module 204, and/or the action module 206 determine 410 that the detected gesture matches the predefined gesture, the action module 206 performs 412 the action associated with the detected gesture, and the method 400 ends.

Figure 5:
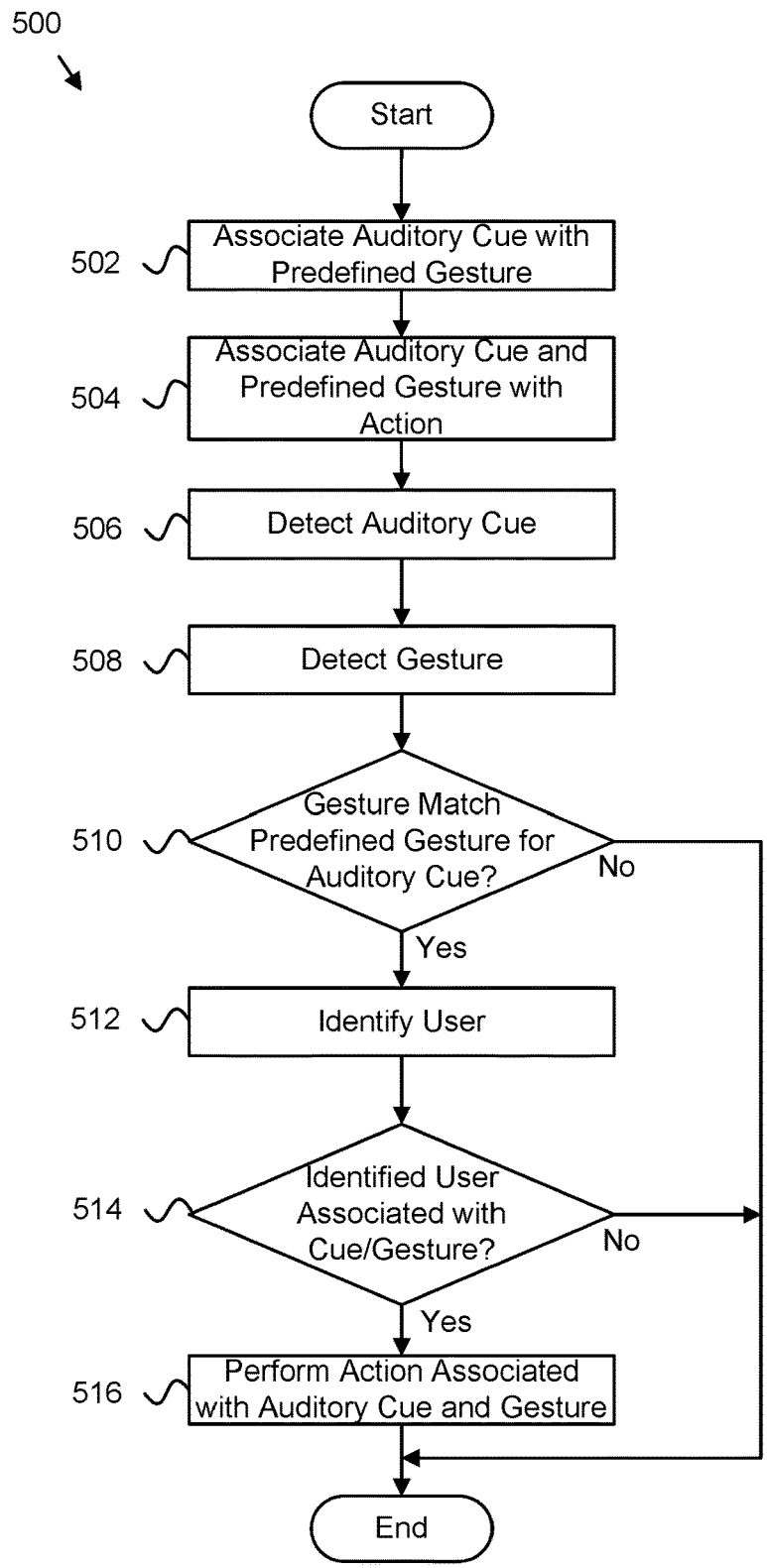
FIG. 5 is a schematic flow chart diagram illustrating one embodiment of another method for gesture detection.

FIG. 5 is a schematic flow chart diagram illustrating one embodiment of a method 500 for gesture detection. In one embodiment, the method 500 begins and the cue module 202 and/or the gesture module 204 associates 502 an auditory cue with a predefined gesture. The gesture module 204 and/or the action module 206, in one embodiment, associates 504 the auditory cue and associated predefined gesture with an action.

In some embodiments, the cue module 202 detects 506 an auditory cue associated with a predefined gesture based on input received from one or more sensors. In a further embodiment, the gesture module 204 detects 508 a gesture in response to the auditory cue based on gesture input received from the one or more sensors.

In various embodiments, the cue module 202, the gesture module 204, and/or the action module 206 determines 510 whether the performed or detected gesture matches the predefined gesture associated with the detected auditory cue. If not, the method 400 ends. For example, if the detected gesture for the auditory cue "scroll up" is a head nod gesture in an up to down motion, the gesture module 204 may determine 510 that the detected gesture does not match the predefined gesture, e.g., a hand waving gesture in a down to up motion, and the method 500 ends.

Otherwise, if the cue module 202, the gesture module 204, and/or the action module 206 determine 510 that the detected gesture matches the predefined gesture, the cue module 202, the gesture module 204, and/or the action module 206 identifies the user 512, based on input received from one or more sensors, and determines 514 whether the identified user is associated with the auditory cue and or detected gesture. If not, the method 500 ends. Otherwise, the action module 206 performs 516 the action associated with the detected gesture, and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   one or more sensors;
   a processor;
   a memory that stores code executable by the processor to:
   detect an auditory cue based on input received from the one or more sensors;
   determine that the auditory cue is registered as an auditory cue that is associated with a particular gesture in a predefined auditory cue/gesture pairing;
   detect a gesture directly in response to determining that the detected auditory cue is a registered auditory cue based on gesture input received from the one or more sensors;
   determine an identity of the user providing the auditory cue and the gesture; and
   perform an action associated with the detected auditory cue/gesture pairing in response to:
   determining that the detected gesture is the particular gesture associated with the registered auditory cue; and
   determining that the identity of the user providing the auditory cue and the gesture matches a previously registered user identity associated with the auditory cue/gesture pairing.

2. The apparatus of claim 1, wherein the auditory cue comprises a predefined phrase.

3. The apparatus of claim 1, wherein the auditory cue comprises a predefined sound.

4. The apparatus of claim 1, wherein the predefined gesture comprises a body gesture.

5. The apparatus of claim 1, wherein the predefined gesture comprises a facial gesture.

6. The apparatus of claim 1, wherein the predefined gesture comprises a combination of a body gesture and touch gesture.

7. The apparatus of claim 1, wherein the detected gesture is detected one of before and simultaneously with detection of the auditory cue.

8. The apparatus of claim 1, wherein the code is further executable by the processor to associate the auditory cue with the predefined gesture.

9. The apparatus of claim 1, wherein the code is further executable by the processor to associate a combination of the auditory cue and the predefined gesture with the action.

10. The apparatus of claim 1, wherein the one or more sensors is selected from the group consisting of a digital camera, an infrared camera, a capacitance sensor, a microphone, a vibration sensor, and a noise field sensor.

11. A method comprising:
    detecting, by use of a processor, an auditory cue based on input received from the one or more sensors;
    determining that the auditory cue is registered as an auditory cue that is associated with a particular gesture in a predefined auditory cue/gesture pairing;
    detecting a gesture directly in response to determining that the detected auditory cue is a registered auditory cue based on gesture input received from the one or more sensors;
    determining an identity of the user providing the auditory cue and the gesture; and
    performing an action associated with the detected auditory cue/gesture pairing in response to:
    determining that the detected gesture is the particular gesture associated with the registered auditory cue; and
    determining that the identity of the user providing the auditory cue and the gesture matches a previously registered user identity associated with the auditory cue/gesture pairing.

12. The method of claim 11, wherein the auditory cue comprises one of a predefined phrase and a predefined sound.

13. The method of claim 11, wherein the predefined gesture comprises one of a body gesture and a facial gesture.

14. The method of claim 11, wherein the predefined gesture comprises a combination of a body gesture and touch gesture.

15. The method of claim 11, wherein the detected gesture is detected one of before and simultaneously with detection of the auditory cue.

16. The method of claim 11, further comprising associating the auditory cue with the predefined gesture.

17. The method of claim 11, further comprising associating a combination of the auditory cue and the predefined gesture with the action.

18. A program product comprising a computer readable storage medium that stores code executable by a processor, the executable code comprising code to perform:
    detecting an auditory cue based on input received from the one or more sensors;
    determining that the auditory cue is registered as an auditory cue that is associated with a particular gesture in a predefined auditory cue/gesture pairing;

detecting a gesture directly in response to determining that the detected auditory cue is a registered auditory cue based on gesture input received from the one or more sensors;
determining an identity of the user providing the auditory cue and the gesture; and
performing an action associated with the detected auditory cue/gesture pairing in response to:
  determining that the detected gesture is the particular gesture associated with the registered auditory cue; and
  determining that the identity of the user providing the auditory cue and the gesture matches a previously registered user identity associated with the auditory cue/gesture pairing.

* * * * *